United States Patent [19]
Steely, Jr. et al.

[11] Patent Number: 5,829,051
[45] Date of Patent: Oct. 27, 1998

[54] APPARATUS AND METHOD FOR INTELLIGENT MULTIPLE-PROBE CACHE ALLOCATION

[75] Inventors: Simon C. Steely, Jr., Hudson, N.H.; Richard B. Gillett, Jr., Westford; Tryggve Fossum, Northborough, both of Mass.

[73] Assignee: Digital Equipment Corporation, Maynard, Mass.

[21] Appl. No.: 223,069

[22] Filed: Apr. 4, 1994

[51] Int. Cl.$^6$ .................................................. G06F 9/26
[52] U.S. Cl. .......................... 711/216; 711/113; 711/220; 711/217; 711/213
[58] Field of Search ............................... 395/442, 421.06, 395/445, 403, 446; 711/113, 118–119, 3, 202, 206, 216

[56] References Cited

U.S. PATENT DOCUMENTS

| | | | |
|---|---|---|---|
| 5,418,921 | 5/1995 | Cortney et al. | 395/441 |
| 5,509,135 | 4/1996 | Steely, Jr. | 395/474 |
| 5,544,345 | 8/1996 | Carpenter et al. | 395/477 |

OTHER PUBLICATIONS

Applicant's admitted prior art in the disclosure, Apr. 1994.
Anant Agarwal, "Analysis of Cache Performance for Operating Systems and Multiprogramming" Kluwer Academic Publishers, pp. 003–006.

*Primary Examiner*—Eddie P. Chan
*Assistant Examiner*—T. V. Nguyen
*Attorney, Agent, or Firm*—Joanne N. Pappas

[57] ABSTRACT

An apparatus for allocating data to and retrieving data from a cache includes a memory subsystem coupled between a processor and a memory to provide quick access of memory data to the processor. The memory subsystem includes a cache memory. The address provided to the memory subsystem is divided into a cache index and a tag, and the cache index is hashed to provide a plurality of alternative addresses for accessing the cache. During a cache read, each of the alternative addresses are selected to search for the data responsive to an indicator of the validity of the data at the locations. The selection of the alternative address may be done through a mask having a number of bits corresponding to the number of alternative addresses. Each bit indicates whether the alternative address at that location should be used during the access of the cache in search of the data. Alternatively, a memory device which has more entries than the cache has blocks may be used to store the select value of the best alternative address to use to locate the data. Data is allocated to each alternative address based upon a modified least recently used technique wherein a quantum number and modula counter are used to time stamp the data.

17 Claims, 4 Drawing Sheets

APPARATUS AND METHOD FOR INTELLIGENT MULTIPLE-PROBE CACHE ALLOCATION

FIELD OF THE INVENTION

This invention relates generally to the field of computer systems and more specifically to the field of memory design in a computer system.

BACKGROUND OF THE INVENTION

As it is known in the art, computer processing systems include central processing units which operate on data stored in memory. Increased computer processing performance is often achieved by including a smaller, faster memory, called a cache, between the central processor and the memory for temporary storage of the memory data. The cache reduces the latency associated with memory access by storing subsets of the memory data which can be quickly read and modified by a central processing system.

There are a variety of methods used to map data from memory into the cache. In a conventional direct mapped cache system, data from memory is mapped into the cache by using the lower address bits of the memory address to provide the cache address, and storing the upper address bits of the memory address along with the data in the cache. The upper bits of the memory address are commonly referred to as a tag.

When a processor requires data from the cache it addresses the cache and compares the stored tag to the upper bits of the address of the required data. If the data is not in the cache, the tag will not match the upper address bits and there is a 'miss' in the cache. Following a cache miss, a memory read is performed to fill the cache with the required data. Frequent cache misses are undesirable due to the increased latency incurred in obtaining the required data from memory.

One problem with a direct mapped cache occurs when two memory locations are both frequently used and both map to the same location in the cache. In such a situation, memory latency accrues as the data at the two frequently used memory locations are frequently transferred into and out of the cache location. Such a situation is called 'thrashing' and is a known disadvantage of direct-mapped caches because the frequent memory accesses degrade system performance.

Hash-rehash cache mapping reduces the probability of thrashing in a cache by providing multiple locations in the cache where data may be stored. The read of a hash-rehash cache operates as follows. First the cache is accessed using the cache address of the required data. If the data is not at that cache location, then a hashing function is applied to the cache address, and a second, hashed address is provided. The cache is then accessed using the hashed address. If the data is present in the location of the hashed address, a hit occurs and the data is transmitted to the processor. Only if the second access is also unsuccessful does the latency associated with retrieving data from memory need to be incurred. If there is a match between the read address and the tag at the hashed cache location, the data from the hashed cache location is swapped with the data at the first cache location to provide faster access to the most recently used data on the next lookup.

One drawback of the hash-rehash cache is that a second cache lookup at a rehash address is attempted after every miss at the first cache address. Where there is a miss at both the first and second cache addresses, the hash-rehash technique replaces potentially useful data at the hashed location. As a result, secondary thrashing occurs due to an increase in the number of memory lookups required to restore data which is overwritten by rehashed data. Secondary thrashing may consequently reduce the performance of hash-rehash caches to below that of direct mapped caches.

Column associative cache mapping improves upon the hash-rehash approach by inhibiting a rehash access if the location reached by the first-time access itself contains data written by a hashed address. In column associative mapping, every cache entry contains an extra bit called a rehash bit which indicates whether the entry is a rehashed location, that is whether the data in the entry was written using a hashing function to provide the write address. The rehash bit provides a mechanism for ensuring that when a cache entry must be overwritten, a rehashed location is always chosen, even if that rehash location is found on the first cache access. Similar to hash-rehash cache mapping, when data is located at the second cache address (the hashed address) the data from the second location is swapped with that in the first location. By swapping the data from the two locations, the most recently used data will be found on the next access at the first cache address, while the 'older' data which was formerly located at the first cache address can be found at the hashed location. If the most recently used data is needed on a subsequent access, it is therefore available after only one cache access.

Some drawbacks with the column associative cache mapping include the fact that thrashing may still occur if data from 3 memory locations are frequently used and must be stored using a common cache address. In addition, the swapping of data between cache locations is impractical when the cache is off-chip due to the latency associated with off chip accesses. The swap effectively reduces processing system performance because it uses valuable processing time which would otherwise be available for actual cache accesses by the central processing chip.

It would be desirable to provide a memory design which minimizes the occurrence of thrashing between memory locations without the performance disadvantages caused by swapping data between locations in the cache.

SUMMARY OF THE INVENTION

In accordance with the present invention, an apparatus for allocating data to and retrieving data from a cache includes a processor for processing an instruction set, an address bus coupled to provide an address to and receive an address from said processor, a data bus, coupled to said processor for providing instructions and data to said processor and for receiving data from said processor, and a memory subsystem coupled to said address bus and said data bus. The memory subsystem further includes a first memory, also referred to as a cache, addressed by the lower portion of the address and having a plurality of entries for storing data to be used by the processor, and means for using the lower portion of the address to provide at least three alternative addresses for accessing the cache. The memory subsystem additionally includes means for selecting one of the plurality of alternative addresses for accessing the first memory. The selecting means further includes means for precluding the selection of alternative addresses corresponding to locations in said first memory having invalid data. With such an arrangement, a plurality of cache locations are made available for memory data having common cache indices. As a result, thrashing between memory locations having a common cache index is minimized. In addition, because each alternative address is only addressed when it addresses an entry having valid data, a minimum number of cache accesses are required before a determination is made that the data is not in the cache. Further, because addresses containing valid data are quickly identified, a mechanism is provided which allows for fast access of valid, multiple addresses without the overhead of swapping data between frequently used addresses.

BRIEF DESCRIPTION OF THE DRAWINGS

The above-mentioned and other features of the invention will now become more apparent by reference to the following description taken in connection with the accompanying drawings in which.

DETAILED DESCRIPTION OF THE PREFERRED EMBODIMENTS

Figure 1:
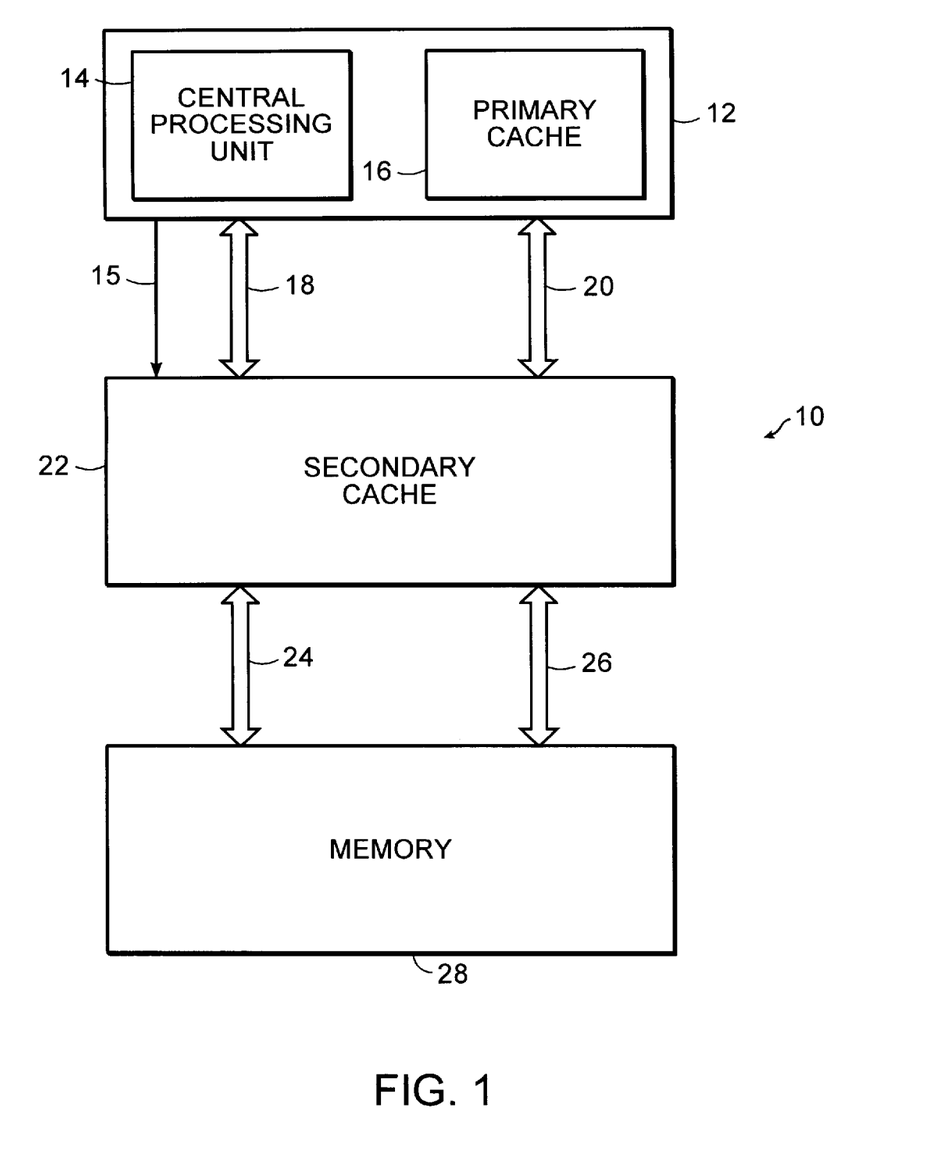
FIG. 1 is a block diagram of a computer system for use with the invention.

Referring now to FIG. 1, a computer processing system 10 is shown to include a microprocessor 12 for processing an instruction stream. The microprocessor typically includes a central processing unit 14 and at least one level of cache, hereinafter referred to as a primary cache 16. The primary cache 16 is typically a small, fast cache for storing instructions and data for immediate use by the central processing unit 14. Usually the primary cache is disposed on a common semiconductor substrate with the microprocessor, thus providing a so-called "on-chip cache".

The microprocessor 12 is coupled by a command bus 15, an address bus 18, and data bus 20 for communication with an off chip cache, hereinafter referred to as a secondary cache 22. The secondary cache 22 is generally larger than the primary cache, and is coupled by a memory address bus 24 and a memory data bus 26 to a memory 28. The memory 28 is larger than the secondary cache 22, and typically much slower than the central processing unit 14 of the microprocessor 12. The primary and secondary caches therefore serve to alleviate the performance differential between the memory device and the central processing unit by providing means for storing data from memory and delivering the data to the central processor at an increased data rate.

Figure 2:
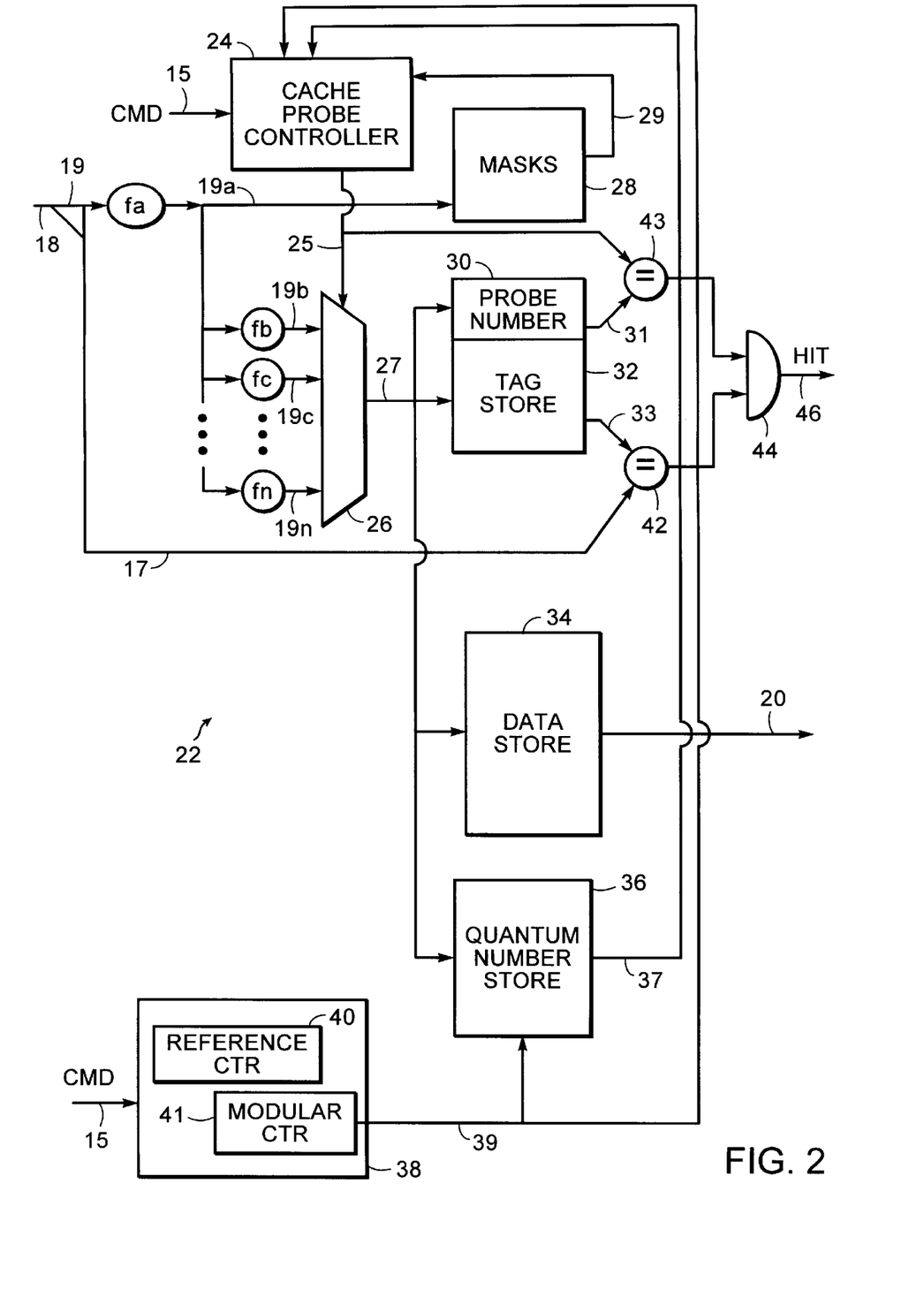
FIG. 2 is a block diagram illustrating one embodiment of a cache subsystem for use in the computer system of FIG. 1.

Referring now to FIG. 2, a secondary cache subsystem 22 is shown coupled to microprocessor 12 (FIG. 1) via bus 18. The secondary cache subsystem 22 receives an address via bus 18 from the microprocessor 12. The address on bus 18 is a full address used to access memory 28 (FIG. 1). The address on bus 18 includes an upper address portion on bus 17 and a lower address portion on bus 19. The lower address portion on bus 19 is used to provide a cache index for accessing a cache data store 34.

A multiplexer 26 receives as inputs a plurality of altered addresses on busses 19b through 19n. The altered addresses are derived from the address on bus 19 by manipulating the address according to a corresponding plurality of functions, fa through fn.

A cache probe controller 24 provides control signals to multiplexer 26 which in turn selects one of the plurality of altered addresses to address a probe number store 30, a tag store 32, the cache data store 34 and a quantum number store 36 via bus 27. The cache probe controller 24 receives inputs from a mask store 28 and the quantum number store 36. The mask store 28 provides a mask on bus 29 to the cache probe controller for use during cache reads to select appropriate altered addresses for accessing the devices coupled to bus 27.

The quantum data store 36 provides a quantum number on bus 37 to the cache probe controller which is used during allocation to select an appropriate cache write address.

The quantum counter 38 provides the present quantum count on line 39 to the cache controller. The present quantum count is used both during allocation to choose an appropriate cache location, and whenever data is referenced in the cache, to provide a time indication of the last reference of the cache location.

The probe number store 30 stores the probe number used to provide the address for the corresponding cache data store location, and will be described in more detail later in the specification. The cache data store 34 is used for temporary storage of memory data.

The quantum number store 36 is used to store a quantum number which is used to identify how long the data has been stored at the corresponding location of the cache data store 34. Thus the quantum number provides what is commonly referred to as a "time-stamp" for data in the cache. Time-stamps are commonly used to identify the "oldest" data in the cache, that is the cache location that contains data which has not been accessed in the longest period of time. The quantum number store 36 is coupled to receive write data from a quantum counter 38.

The tag store 32 is used to store the upper address bits of the memory address of the data stored in the corresponding location of the cache data store 34. These upper address bits are commonly referred to as the 'tag' for the cache data. The cache tag store 32 is accessed at the same time and with the same address as the cache data store 34. Each entry of the cache tag store contains the upper address portion of the memory address of the data which is stored in the corresponding cache data store location. As mentioned previously, this upper address portion is commonly referred to as a 'tag'. The tag is compared against the upper portion of the address on bus 17. If the tag and the address on bus 17 match, there is said to be a 'hit' in the cache data store 32.

If there is no match, there is a 'miss' at that cache location. There are two alternatives for obtaining the correct data in the event of a miss at the first address. First, the data may be located in another, different cache data store location, and a second cache access, or 'probe', can be performed to locate the data. Second, the data can be obtained directly from memory.

The present invention provides a mechanism for performing multiple cache data store probes to search for the required data at different cache location to avoid the latency associated with memory accesses.

The cache subsystem 22 according to the invention decreases the number of main memory accesses and thereby improves the performance of the central processing system as follows. As mentioned above, the cache subsystem receives the full memory address on bus 18 and the lower portion of the address is provided as a cache index on bus 19. A plurality of logical functions, fa through fn, are used to manipulate the cache index to provide a corresponding plurality of alternative cache addresses on busses 19a through 19n which may be used to locate data within a cache data store 22. It should be noted that here the range fa through fn is meant to convey that the cache index on bus 19 can be altered to provide any number of alternative addresses, from 0 through the size of the cache itself. The actual number selected is design dependant, and responsive to the size of the cache, the latency associated with accessing memory, and the performance goals of the design.

The logical functions fa through fn may comprise a hashing function, an XOR function, or a similar function which would manipulate the address to provide a different, alternative address. For example, each function fa through fn could provide a hashing function where the bits of bus 19 are exchanged, or shuffled, into n different bit-ordering arrangements to provide n different alternative addresses. Functions fa and fb may be a non-operative function which does not alter the input address bits, and thus provides the true cache index for that probe of the cache.

The functions fa through fn should be provided to be dependent only upon the combination of the cache index bits on bus 19 and some independent function; not on any other bits of the address on bus 18. For example, each hashing function fa through fn may add a different prime number to the cache index. Thus for a group of memory address having a common cache index, (that is, identical values on bus 19), the function fa will provide the same alternative address. Thus there is certainty as to which alternative addresses in the cache are associated with a definitive cache index, because a common group of alternative addresses (fa through fn) is statically defined for each cache index input on bus 19.

By providing a number of alternative addresses for storing data in the cache data store, the problems associated with thrashing are alleviated because frequently used memory data having identical cache indices can be allocated to multiple addresses within the cache.

Depending on the number of available alternative cache addresses, there is potentially a large number of cache locations for storing memory data having a common index. During a cache read, each location should be probed in search of the data before it is determined that there is a cache miss. As a consequence, as the number of alternative cache addresses increase there is a potential for the performance of the system to decrease due to the number of cache probes required before a miss can be determined.

However, although there are 'n' alternative addresses for each cache index, all n cache locations do not always contain valid data associated with that cache index. It is only when a number of cache references with the same cache index need to store data in the cache at the same time that the alternative locations are used. Therefore, when searching for data in the cache, the cache probe controller 24 should not have to probe every alternative address to find the required data. Rather, only the alternative addresses of valid data are probed. The mask stored in mask store 28 is used to identify which alternative addresses of the cache index are valid.

In parallel with the first probe access of the cache data store 32, the mask store 28 provides a mask to the cache probe controller 24. The mask store 28 stores an 'n' bit mask. Each bit of the 'n' bit mask directly corresponds to one of the n alternative addresses which are input to multiplexer 26. Each bit of the mask identifies whether or not valid data is stored at the corresponding alternative address. Data is considered valid when the alternative address stores data corresponding to the cache index provided on bus 18. The data is considered invalid if the data at the alternative address corresponds to a different cache index. Such a situation can occur due to the overlap of alternative addresses for each cache index. A logical '1' indicates that the alternative address corresponding to the bit location in the bit field contains valid data and should be probed, while a logical '0' indicates that alternative address does not contain valid data and should not be probed.

Each mask bit is set when the data is allocated to the alternative address corresponding to the cache index. Each mask bit can be cleared in two ways. First, the bit can be cleared when the corresponding cache location is overwritten by new data associated with a different cache index, which mapped to this address after performing one of the n hashing functions. Alternatively, the bit can be cleared during a probe when it is determined that the probe number from the probe store 30 does not match the probe select on line 25 from the probe controller.

The mask store 28 thus reduces the delay associated with probing all of the alternative addresses by ensuring that only the alternative addresses which contain valid data are accessed.

In the above embodiment, it should be noted that the mask store 28 is accessed in parallel with the cache data store 34, and tag store 32. Therefore, there is one probe of the cache data store at the first alternative address derived from functions fa and fb before the mask on bus 29 may be used by the cache probe controller 24. In the event that no bits in the mask are set, it is certain that there is a miss in the cache data store and a reference to memory is to be performed to obtain the data. Despite this knowledge, with the arrangement shown in FIG. 2, at least one cache probe is always performed before the miss status can be determined.

To alleviate the above described problem, the mask store 28 may alternatively be arranged to be accessed serially with reference to the cache data store 34. Using a serial arrangement, the mask store is accessed and the mask is decoded by cache probe controller 24 before the first cache data store access is initiated, rather than in parallel with the first cache data store access as shown in FIG. 2. The advantage of such an arrangement is that a miss in the cache can be known without any actual cache data store probes when a mask of all zeros is returned from the mask store before the first access. One drawback of the arrangement is that accessing the mask in serial is only useful for those cases where the table of masks fits on the microprocessor 12, or when it can be accessed early before the cache address bus 18 is driven by microprocessor to satisfy setup constraints. Thus the placement of the mask store is dependent upon the constraints of the design because both serial and parallel placement are feasible.

As discussed previously, the probe store 30 stores a probe number associated with the data at the corresponding address in the cache data store 34. The probe number indicates which one of the plurality of logical functions fa through fn was applied to the cache address when the data was stored at the corresponding address of the cache data store 34. Thus, the possible values of the probe number directly correspond to the number of alternative addresses available for selection via multiplexer 26. The probe number store may be stored as a hexadecimal number or a binary number. For example, in an embodiment which uses eight alternative addresses, the probe number may comprise 3 bits.

The probe number is useful because two cache indexes on bus 19 can end up providing the same alternative address on bus 27 depending on the logical function used to manipulate the respective cache index. For example, in a given cache subsystem, there may be two distinct logical functions for hashing addresses, functions fx and fy. Function fx may invert the lowest bit of the cache index. The logical function fy may invert the highest bit of the cache index. Given two distinct memory addresses with the same tag but different cache indices, where the first index is A=1000 and the second index is B=0001, performing the function fx on address A provides an altered address of 1001. Similarly, performing the function fy on address B provides the altered address of 1001. Because the tags are identical, an indication of which probe provided the altered address is necessary to preclude incorrect data from propagating through the system.

As mentioned previously, when an alternative address references a probe store location having a probe number which is not equal to the probe select value provided by cache probe controller 24, the mask bit entry corresponding to the alternative address is cleared.

A HIT in the cache subsystem 22 is determined by comparator 43 which compares the probe number from probe store 30 to the probe select from the cache probe controller 24. In addition, comparator 42 compares the tag to the address bits on bus 17. When both comparators 43 and 42 indicate a match, the HIT signal on bus 46 is asserted.

Because the cache data store 34 stores only a subset of the memory data, for each memory reference the data is either currently stored in the cache or it must be fetched from memory. When the data is currently in the cache, there is a 'hit' in the cache, as described above. When the data needs to be fetched from memory, there is said to be a 'miss' in the cache, and space is allocated in the cache data store 34 to provide storage for the new data when it is received from memory.

Data may be allocated to a particular location of the cache data store 34 due to a write operation or due to a read operation which results in a miss. Because there are 'n' altered addresses for each cache address provided on bus 19, an optimal one of the altered addresses should be selected for storing the data when it is retrieved from the memory 28 or from the microprocessor 12. The optimal address is the address which will minimize the number of subsequent references that miss, and thus reduce thrashing between different memory addresses accessing a common cache location.

One type of allocation is a Least Recently Used (LRU) technique of allocation. In LRU allocation, a temporal indicator is stored for each cache location when data is written into the cache location. This temporal indicator serves as a so-called 'time-stamp' because it provides a temporal characteristic to the stored data. In general, the time-stamp is used to determine which data in the cache is least recently used to determine which location contains the least critical data so that location my be overwritten with new data.

In this embodiment, when an address misses in the cache, the time-stamp of each alternative cache entry is checked to determine which entry contains the oldest time stamp. The cache entry of the alternative address with the oldest time stamp is overwritten with the new data.

An allocation method according to the present invention uses a modular LRU allocation technique where instead of using a true time stamp for each cache entry, a quantum number is stored each time data is allocated to a cache entry. The quantum number is a modular number which is incremented after a quantum unit of time. The unit of time may be measured in terms of a number of CPU clock cycles, a number of cache references, or any frequently occurring event. Here, a quantum of 512 cache references is used.

As shown in FIG. 2, a reference counter 40 provides an increment signal to a modular counter 41 after every 512 cache references. The reference counter is a standard 9 bit wrap around counter well known to one of skill in the art. The modular counter 41 is also a wrap around counter, which could be comprised of between 8 to 12 bits, depending on the available hardware and the frequency of the selected quantum event.

The reference counter 40 and the modular counter 41 are free-running counters, keyed off of the number of cache references received on cache command bus 15. Each time a location is referenced in the cache data store 34, for either a read which 'hits' or a write operation, the current value of the modular counter 41 is loaded into a corresponding location of the quantum number store 36. The cache reference then triggers an increment in the reference counter 40. In the event that the reference counter 40 overflows, modular counter 41 is then incremented.

Because each entry of the cache data store 34 has a corresponding entry in the quantum number store 36, during allocation for a write or a read miss each alternative address may be iteratively probed to find the cache location with the oldest data. The cache probe controller 24 operates to control the probing of each alternative address during allocation.

Figure 3:
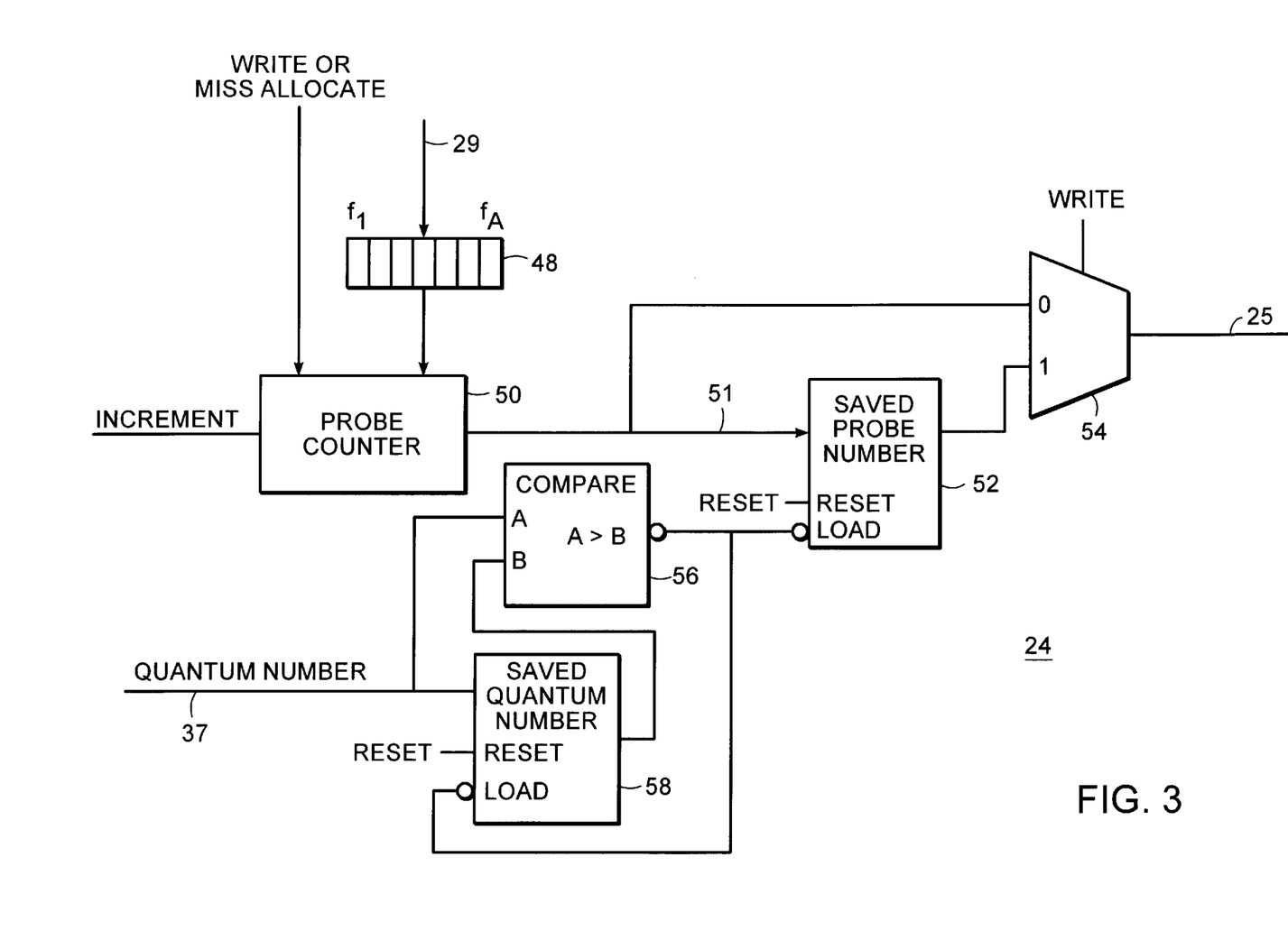
FIG. 3 is a block diagram illustrating a controller for use in the cache subsystem of FIG. 2.

Referring now to FIG. 3, the cache probe controller 24 is shown to include a probe counter 50, which receives as input an 'ALLOCATE' signal as well as a mask on bus 29 from the mask store 28 (FIG. 2). The ALLOCATE signal is decoded from the command on bus 15 and the HIT signal on bus 46, and is asserted either when there is a write to the cache data store, or when a read of the cache data store resulted in a miss. The assertion of the ALLOCATE signal causes the probe counter 50 to iteratively select each and every alternative address input to mux 26 (FIG. 2).

During the read operation described above, the mask is received on bus 29 and stored in a register 48. The probe counter 50 uses the mask to select the alternative addresses that correspond to the bits in the mask which are asserted. The probe counter 50 provides a select value on bus 51, and the select value is either stored in flop 52 or output through mux 54. During a read of the cache data store 34, the output of the probe counter is propagated through mux 54. During allocation the output from the probe counter is used to drive the select for mux 26 (FIG. 2) to provide an alternative address.

Each alternative address accesses the quantum number store 36 to retrieve the quantum number associated with the corresponding entry in cache data store 34. The quantum number provided on bus 37 is received by the cache probe controller 24 and compared by a modular comparator 56 against a saved quantum number store in flop 58. It should be noted that only the alternative addresses of a common cache index are compared. Therefore the quantum number provided from the cache data store access associated with the first alternative address is always stored in flop 58, and is used as the stored quantum value in a subsequent comparison.

Modular arithmetic is used by comparator 56 to determine whether the quantum number provided on bus 37 is greater than the quantum number stored in flop 58. Modular arithmetic is known to one of skill in the art to basically be a method of determining the oldest value by determining which number is displaced from a given number by the largest number of increments.

Modular arithmetic therefore ensures that in a situation wherein there is a 4 bit wrap-around modular counter with a current hexadecimal value of 1, one location with a quantum number of 2 and one location with a quantum number of F, that the location with the quantum number of 2 is chosen as the least recently used location.

When comparator 56 determines that the quantum number provided by a probe is greater than the saved quantum number, the comparator asserts an enable signal on bus 57, and the new quantum number is saved in flop 58. Concurrently, the probe number which provided the quantum number is saved in flop 52. Once all of the alternative addresses have been checked, the probe number of the oldest data is provided through mux 54 as the allocated address for the write data.

If the latency associated with accessing memory is significantly larger than that associated with cache references, there may be ample opportunity for each alternative address to be probed. Thus the allocation strategy of the present invention reduces the opportunity for thrashing by ensuring that recently accessed data is not overwritten.

Figure 4:
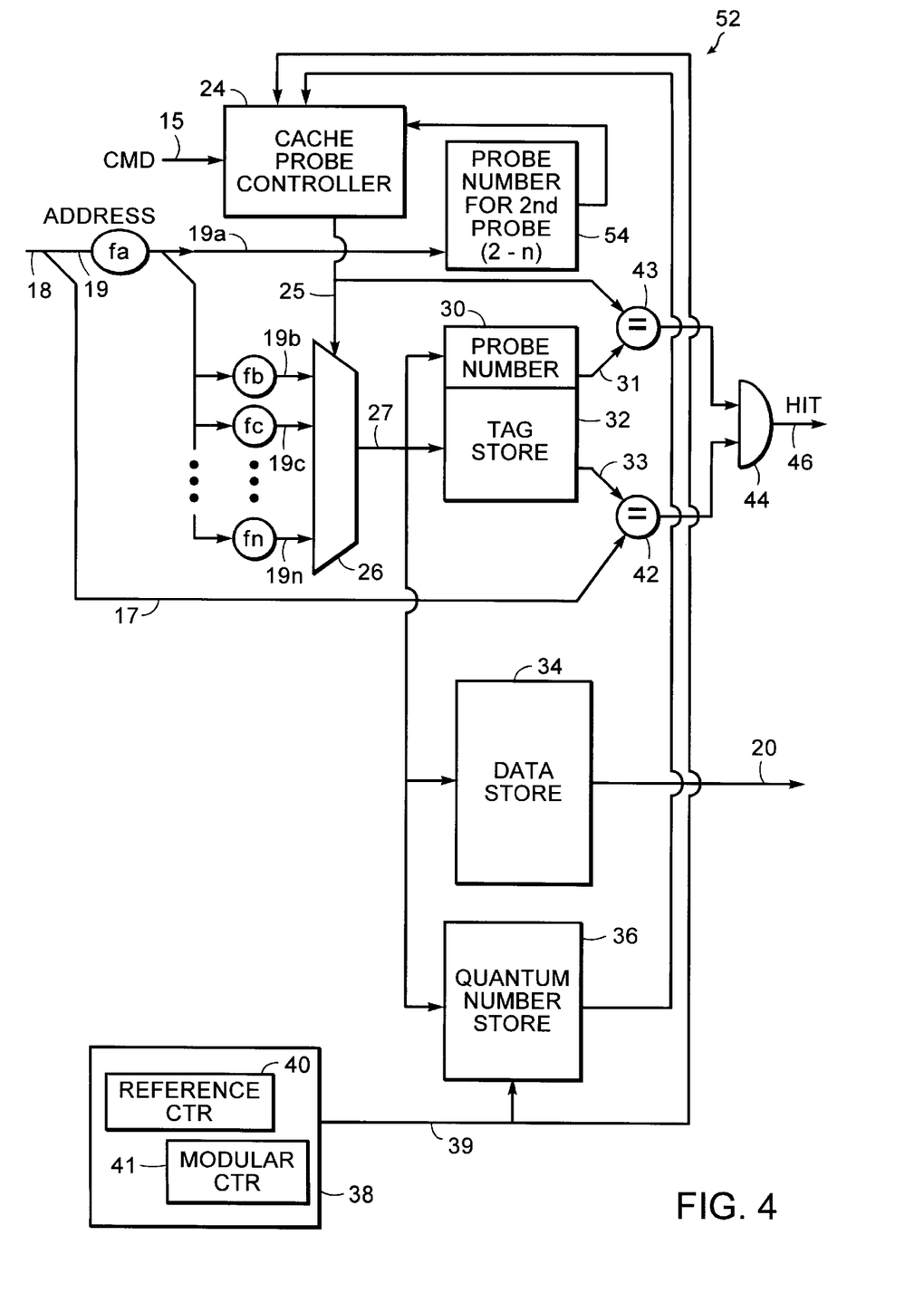
FIG. 4 is a block diagram illustrating a second embodiment of a cache subsystem for use in the computer system of FIG. 1.

Referring now to FIG. 4, another embodiment of a cache subsystem 52 is shown to include a second probe predict store 54 in place of the mask store 28 of FIG. 2. The probe predict store 54 stores a probe select value for providing the alternative address of the second probe. Here, the probe predict store 52 may store four to eight times the number of entries than there are blocks in the cache data store 34. Accordingly, two or three additional address bits of the memory address provided on bus 18 would be appended to the cache index on line 19 to provide the address for the probe predict store. It should be noted that the ratio of the number of entries in the probe predict store to the number of entries in the cache data store can range from 1:1 or 1024:1 depending on the constraints of the design.

The larger probe predict store increases the accuracy of the prediction of the second probe alternative address by providing a mechanism for differentiating between memory addresses with a common cache index. By increasing the hit rate of the second probe, the average number of probes required to obtain performance comparable to the multi-probe embodiment of FIG. 2 is reduced to just above two.

During a cache read, the address on bus 18 is altered to provide a first altered address for the cache lookup. The propagation of the address through functions fa and fb provide the first probe address for the cache data store 34. The address is additionally used to index the probe predict store 54. The probe predict store 54 in turn provides the cache probe controller 24 with the probe number for the alternative address of the second cache access.

The alternative address is provided on bus 27 to the cache data store 34, the tag store 32 and the probe store 30 as described with reference to FIG. 2. As discussed previously, the probe number provided by the probe store 30 should match the probe select provided by the cache probe controller 24 to ensure that the data at the cache data store location corresponds to the cache index on bus 18. If the probe number retrieved from probe store 30 does not match the probe select provided by cache probe controller via the probe predict store, the probe number at that location of the probe number store 30 is invalidated.

If either probe hits, the data is returned to the central processing unit 12. If both probes miss, data is obtained from memory, and space is allocated in the cache data store 34.

Because only two locations are probed in this embodiment, care is taken to ensure that data is not stored at an alternative address location which will not be referenced by a probe under the cache index. Even though both addresses missed, both locations could contain valid data corresponding to the cache index. There could simply be a mismatch of the tags. If both locations are valid, the modular LRU mechanism discussed with reference to FIGS. 2 and 3 may be used to ensure that the oldest data between two valid locations is overwritten.

If the data at the first alternative address location is not valid, the location is always overwritten with the new data. If the data at the first alternative address is valid, and no other alternative addresses are valid, this situation is indicated by the probe predict store. The probe predict store can indicate that there is no valid data at the remaining alternative addresses by reserving one of the probe numbers to indicate that no alternative action should be taken. When the reserved probe number is detected, all of the alternative address locations are referenced to determine the least recently used address in the manner described with reference to FIGS. 2 and 3.

When the cache data store location selected as the least recently used location is determined, the write data is stored at the selected cache data store location and the probe number of the LRU location is stored in the probe predict store 54. Concurrently, the probe number is stored in the probe number store 30 at the alternative address of the LRU location.

The performance of the cache subsystem of FIG. 4 may be further improved by storing the tag of the data along with the second probe number in the probe predict store 54. At a cost of increased pins and memory components, a determination of a hit or miss on the second probe could be made before the second cache access.

Such an arrangement provides improved performance over the mask cache subsystem of FIG. 2 because fewer cache accesses are required before a cache hit or miss determination is made. The cost of the improved performance is an increase in the area of the design as the probe predict store size is increased. Both alternatives, however, provide improved performance over former methods by minimizing the possibility of thrashing between frequently used memory locations. In addition, the performance has been improved without swapping data between locations in the cache data store, and thus cache access cycles used merely for organizing the cache data have been removed.

Although the above description discloses as a caching system for use with a central processor and secondary cache system, it is to be understood that the above techniques may also be used in other arrangements, for example disk caching systems.

Having described a preferred embodiment of the invention, it will now become apparent to one of skill in the art that other embodiments incorporating its concepts may be used. It is felt, therefore, that this embodiment should not be limited to the disclosed embodiment, but rather should be limited only by the spirit and scope of the appended claims.

What we claim is:

1. An apparatus comprising:
   a bus disposed to provide address data;
   a memory subsystem coupled to said bus, said memory subsystem comprising:
      a first memory having a plurality of locations for storing data, said first memory addressed by a lower portion of said address;
      means for encoding said lower portion of said address on said bus to provide at least three alternative addresses for accessing said first memory; and means for selecting one of said plurality of alternative addresses for accessing said first memory, wherein said means for selecting includes means for precluding the selection of alternative addresses corresponding to locations in said first memory which store data that is not associated with said lower portion of said address.

2. The apparatus of claim 1, further comprising:

a tag store accessed using said lower portion of said address, said tag store for storing the upper portion of said address on said bus when data is written a corresponding location of said first memory;

a probe number store having a plurality of locations corresponding to said plurality of locations of said first memory, said probe number store for storing a probe number value indicating which of said alternative addresses was used to write said data in said corresponding location of said first memory.

3. The apparatus of claim 2, further comprising:

a second memory, larger and slower than said first memory, coupled to said bus, with said first memory including a plurality of addressable locations each for storing data from said second memory, and wherein said second memory is accessed using said address on said bus.

4. The apparatus of claim 3 further comprising means for allocating a data location in said first memory for storage of data from said second memory.

5. The apparatus of claim 1, wherein said means for selecting further comprises:

a mask store having a plurality of locations corresponding to said plurality of locations of said first memory, each of said locations for storing a mask, said mask having a plurality of bits corresponding to the plurality of alternative addresses, wherein each bit indicates whether the data at said corresponding alternative address corresponds to said value of said lower portion of said address.

6. The apparatus of claim 5 wherein said mask store is addressed during a first access of said first memory and wherein said alternative addresses are provided in sequence to said first memory responsive to the state of the bit in the corresponding mask location.

7. The apparatus of claim 5 wherein said mask store is addressed before a first access of said first memory and said alternative addresses are provided in sequence to said first memory responsive to a valid indication in said corresponding mask location.

8. The apparatus of claim 1 wherein said means for selecting further comprises:

a probe prediction store, comprising a plurality of locations corresponding to said plurality of locations of said first memory and wherein each entry of said probe prediction store comprises a probe select value;

wherein said first memory and said probe prediction store are accessed in parallel, and wherein said probe select value is provided from said probe predict store to select the alternative address of a second access to said first memory.

9. The apparatus of claim 8 wherein each entry of said probe predict store further comprises a tag field containing the upper bits of the address of the data stored in the corresponding location of said first memory.

10. The apparatus of claim 4, wherein said means for allocating an entry further comprises:

means for storing a duration characteristic of each of said plurality of locations in said first memory, said means for storing having a plurality of locations corresponding to said plurality of locations of said first memory;

a counter, incremented upon each occurrence of a predetermined event, coupled to provide a count value for storage as said duration characteristic in said storage means; and means for comparing the duration characteristic at each alternative address that is indicated by said mask as corresponding to said lower portion of said address against said count value to select an alternative address.

11. A method for addressing a cache comprising the steps of:

encoding a portion of an address provided on a bus coupled to said cache to provide a plurality of alternative addresses for accessing said cache;

indicating whether the data in said cache at each of said plurality of alternative addresses is related to said portion of said address provided on said bus;

providing a duration characteristic for each location of said cache to identify when said respective entry was referenced; and selecting one of said plurality of alternative addresses for reading said cache responsive to said duration characteristic of said location addressed by said alternative address and responsive to whether said data at said alternative address is related to said portion of said address.

12. The method according to claim 11, wherein said step of indicating further comprises the steps of:

providing a mask store having a plurality of locations corresponding to said plurality of locations of said cache;

storing a mask at each of said locations, said mask having a number of bits corresponding to the number of alternative addresses, wherein each bit indicates whether that the data at said corresponding alternative address is valid; and updating the bits of a mask location when data is written to the corresponding location of said cache, said updating comprising the step of corresponding to the e bit corresponding to the alternative address used to write the data responsive to whether said data at said location is valid.

13. The method according to claim 11 wherein said step of indicating further comprises the steps of:

providing a probe prediction store, comprising a plurality of locations corresponding to said plurality of locations of said cache and wherein each location of said probe prediction store comprises a probe select value.

14. The method according to claim 11, further comprising the steps of:

providing a duration characteristic for each location of said cache, said duration characteristic indicating when said entry was last referenced;

during allocation, comparing the duration characteristic at each alternative address against a count reference to select an alternative address as an allocated address for write data.

15. An apparatus comprising:

a processor for processing an instruction set;

an address bus coupled to provide an address to and receive an address from said processor;

a data bus, coupled to said processor for providing instructions and data to said processor and for receiving data from said processor;

a memory subsystem coupled to said address bus and said data bus, said memory subsystem further comprising:
  a first memory having a plurality of locations for storing data to be used by said processor, said first memory addressed by a lower portion of said address;
  means for encoding said lower portion of said address on said address bus to provide a plurality of alternative addresses for accessing said first memory;
  means for selecting one of said plurality of alternative addresses for accessing said first memory; and
  a probe number store having a plurality of storage locations each location having a plurality of bits related to the plurality of alternative addresses, and corresponding to said plurality of locations of said first memory, said probe number store for storing a probe number value indicating which of said alternative addresses was used to store said data in said corresponding location of said first memory.

16. The apparatus of claim 15, wherein said means for selecting further comprises:
  a mask store having a plurality of locations corresponding to said plurality of locations of said first memory, each of said locations for storing a mask, said mask having a number of bits corresponding to the number of alternative addresses, wherein each bit indicates whether the data at said corresponding alternative address corresponds to said value of said lower portion of said address.

17. The apparatus of claim 15, wherein said means for selecting further comprises:
  a probe prediction store, comprising a plurality of locations corresponding to said plurality of locations of said first memory and wherein each entry of said probe prediction store comprises a probe select value;
  wherein said first memory and said probe prediction store are accessed in parallel, and wherein said probe select value is provided from said probe prediction store to select the alternative address of a second access to said first memory.

* * * * *